United States Patent [19]

Lee

[11] Patent Number: 5,380,035

[45] Date of Patent: Jan. 10, 1995

[54] VEHICLE SUSPENSION SYSTEM FOR FRONT WHEELS

[75] Inventor: Un-Koo Lee, Kyungki-do, Rep. of Korea

[73] Assignee: Hyundai Motor Company, Seoul, Rep. of Korea

[21] Appl. No.: 125,202

[22] Filed: Sep. 23, 1993

[30] Foreign Application Priority Data

Dec. 30, 1992 [KR] Rep. of Korea ............. 92-26769

[51] Int. Cl.[6] .................................................. B60G 3/00
[52] U.S. Cl. ............................... 280/691; 280/690; 280/673; 280/675
[58] Field of Search .............. 280/673, 675, 690, 691, 280/696, 688, 660

[56] References Cited

U.S. PATENT DOCUMENTS

| | | | |
|---|---|---|---|
| 2,734,753 | 2/1956 | Lind | 280/673 |
| 3,881,741 | 5/1975 | Muller | 280/696 |
| 3,883,152 | 5/1975 | de Carbon | 280/673 |
| 4,556,238 | 12/1985 | Matschinsky | 280/673 |
| 4,842,296 | 6/1989 | Kubo | 280/663 |
| 4,871,187 | 10/1989 | Schaible | 280/696 |
| 4,964,651 | 10/1990 | Kubo | 280/688 |

FOREIGN PATENT DOCUMENTS

| | | | |
|---|---|---|---|
| 0486337 | 5/1992 | European Pat. Off. | 280/690 |
| 2663266 | 12/1991 | France | 280/691 |
| 0044308 | 2/1989 | Japan | 280/673 |

*Primary Examiner*—Mitchell J. Hill
*Assistant Examiner*—Christopher P. Ellis
*Attorney, Agent, or Firm*—Birch, Stewart, Kolasch & Birch

[57] ABSTRACT

A multi-link type suspension for a steerable driving wheel includes a wheel carrier having a tie rod for a steering wheel, a pair of upper arms each having one end connected to a vehicle body and the other end connected to said wheel carrier, and a connector for connecting the upper arms to the vehicle body and the wheel carrier. A strut arm is connected to the connector wherein a lower section of the strut arm forks to form two separate ends, and a pair of lower arms are provided each having one end connected to one of the strut arm and the other end connected to the wheel carrier. The suspension is such that an intersecting point of an imaginary line parallel to a line that connects a hinge point where one of the upper arms is mounted on the vehicle body and a connection point of the connector, and an imaginary line orthogonal to a center line of the strut arm becomes an imaginary instantaneous center of the upper arms with respect to the vehicle body.

5 Claims, 3 Drawing Sheets

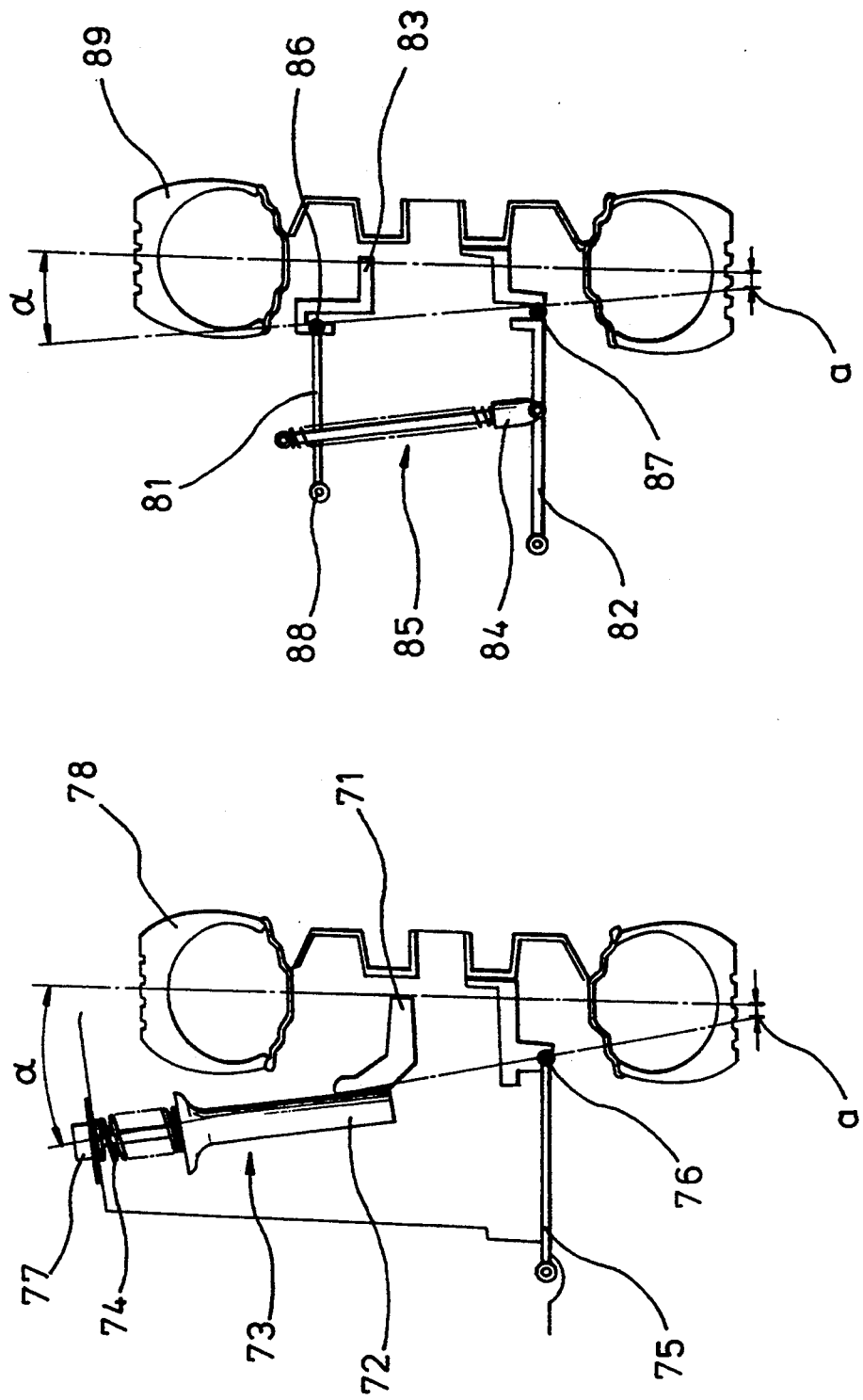

VEHICLE SUSPENSION SYSTEM FOR FRONT WHEELS

BACKGROUND OF THE INVENTION

1. Field of the Invention

The present invention relates to a vehicle suspension system for a steerable drive wheel and in particular, to a vehicle suspension system for a steerable drive wheel which makes it easy to set up an imaginary kingpin axis, improves handling safety by setting up an imaginary link and minimizing the variation ratio of the height of a roll center, enhances free layout degree with respect to a change in the angle of camber and tread, and especially ensures maximum effective volume in an engine room by minimizing the space occupied by a vehicle suspension system.

2. Description of Related Art

In general, a vehicle suspension system for a steerable drive wheel connects an axle shaft and a vehicle body to each other and absorbs vibrations and impacts from a road surface while running so that safety of a vehicle, and an improved riding comfort can be obtained. To absorb impacts, a vehicle suspension system should be flexibly connected vertically, and to ensure driving force, braking force and centrifugal force during a vehicle's turning, which are generated at the wheel, a vehicle's suspension should be horizontally connected firmly. The vehicle suspension system is classified structurally as a suspension system integrated with an axle and an independent suspension system. While a suspension system integrated with an axle is applied to large vehicles like buses, trucks and rear axles of passenger cars, an independent suspension system is applied mainly to an axle of a passenger car, to improve ride comfort and running safety by bisecting an axle and allowing both wheels to act independently. Among these suspension systems, the present invention relates to an independent suspension system.

There are many kinds of independent suspension systems. As a suspension system applied to a steerable wheel, Macpherson type and Wishbone type are applied widely.

A vehicle suspension system for a steerable wheel is designed to control a position of a wheel with respect to the vehicle body to obtain a better positioning in a vehicle operation as well as absorb vibrations or impact. The axle is thereby prevented from directly transmitting impact or vibration from a road surface to the vehicle body, so that there can be obtained an optimal handling safety and running safety.

The front wheel is mounted to be changeable in its direction from right to left or from left to right, centering the kingpin, and is also mounted with a geometry angle to meet requirements for the front suspension.

Mounting the front wheel with the geometry angle is called wheel alignment. The wheel alignment is determined by several elements, but the optimal operation of the front wheel is, however, achieved by the supplemental operation of the elements with respect to each other. A kingpin inclination among the elements reduces a handling force of a steering wheel with a camber, absorbs any impact generated from the vehicle motion and then increases a restitution force of the steering wheel. The turning safety of the straight ahead position of the vehicle and the handling safety in a vehicle's turning position are thereby obtained.

The kingpin inclination is such that the kingpin is mounted with its central line lying at a predetermined angle with respect to the vertical line when the vehicle is viewed from the front. An interval between the central line of the kingpin and a central line of the wheel is called offset. The offset is generally characterized as an offset at the wheel center and an offset at the ground. The offset at the wheel center has an effect on the straight ahead characteristics of the vehicle when a driving force and an engine brake are applied to the wheel. The offset at the ground has an effect on the handling safety when the vehicle brakes and turns. If the offset at the ground is decreased, the sensitivity with respect to the steering is decreased, in the same manner as the handling safety is increased when the vehicle brakes and turns.

Vibration has an effect on the vehicle safety, including rolling, pitching, yawing as well as bouncing of a vehicle during driving. If these vibrations are absorbed softly, not only ride comfort but also stability is improved.

As the vibration of a vehicle is concerned, a vibration generated when a vehicle is turning is defined as rolling, which means that a vehicle vibrates in both side directions, and rolling has an important effect upon turning safety. A certain basic point where rolling occurs is called a roll center. Rolling is certain to occur because the centroid of a vehicle is higher than a roll center. Accordingly the more the height of a roll center changes, the greater the gravity of a vehicle moves. Therefore this phenomenon results in a greater slip angle so that running safety and handling safety become worse. Accordingly, to ensure running safety, the variation ratio of the height of roll center is desired to be minimized.

Considering the above, the prior suspension system is described in detail hereinafter.

FIG. 3A illustrates a general Macpherson type suspension system including a strut arm 73 formed integrally with a steering knuckle 71, provided elastically with a spring 74 at an upper end and contains a shock absorber 72, and a lower arm 75 that is attached to the steering knuckle 71 by a ball joint 76 and to the vehicle body by a hinge.

This suspension system has some advantages of simple structure, a small spring, light mass, and a small effective volume of an engine room. But in order to make the kingpin offset(a) reduced or minus, the upper supporting point 77 of the strut arm 73 is to be moved toward the engine room, or the lower end of the strut arm 73 connected to the ball joint 76 is to be moved outside of the engine room. However, if the upper supporting point 77 of the strut arm 73 is moved toward the engine room, the effective volume of an engine room is reduced and the kingpin angle($\alpha$) becomes excessively large only to have a bad effect on a vehicle's ability to turn. If the lower end of the strut arm 73 connected to the ball joint 76 is moved outside, it is actually impossible to reduce the kingpin offset(a) because it will interfere with a brake disk attached to a wheel.

FIG. 3B illustrates a general Wishbone type suspension system including upper and lower control arms 81, 82, steering knuckle 83, a spring assembly 85 including a shock absorber 84 and ball joints 86, 87 connecting the upper and lower control arms 81, 82 to the steering knuckle 83. In order to adjust the kingpin offset(a) the vehicle body side connecting portion 88 of the upper control arm 81 is to be moved toward the engine room or the ball joint 87 of the lower control arm 82 is to be moved outside. But, in such a Wishbone type suspension system, like the Macpherson type suspension system, if the vehicle body side connecting portion 88 of the upper control arm 81 is moved toward the engine room, the effective volume of an engine room is reduced and the kingpin angle($\alpha$) becomes excessively large to adversely affect turning ability of a vehicle, and if the ball joint 87 of the lower control arm 82 is moved outside, it is actually impossible to reduce the kingpin offset because it will interfere with a brake disk attached to the wheel.

SUMMARY OF THE INVENTION

As noted above, the conventional Macpherson type suspension and Wishbone type suspension have limits to improve the function of suspension systems, because a free layout degree to set up a kingpin angle is limited to such a tiny bound that it is impossible to reduce the size of a kingpin offset. Besides, the vertical motion of a wheel is actuated by short control arms in any type of suspension, so the great change in the height of a roll center makes running safety worse.

In view of such problems of the conventional technology, the present invention is provided. A primary object of the invention is to improve handling safety by making it easy to set up an imaginary kingpin axis and minimize the variation ratio of the height of a roll center with an imaginary link. Another object of the present invention is to enhance the free layout degree by making it possible to set up the kingpin axis independently from the change in the angle of camber and tread. A further object of the invention is to ensure the maximum use of the effective volume of an engine room by minimizing the space occupied by a suspension system.

Such objects can be accomplished by providing a multi-link type suspension system for a steerable drive wheel in accordance with the present invention. This suspension system comprises a pair of upper arms each having one end mounted on a vehicle body, respectively, and the other ends connected to each other by pivot joints, a wheel carrier connected with the upper arms by a ball joint on its upper part, rotatably connected with a wheel rotated by a drive shaft carrying a driving torque from an engine by a tie rod steerably, a strut arm connected to the pivot joint and supporting a lower portion of a strut assembly and a pair of lower arms each having one end mounted on both ends of the strut arm and the other ends mounted on the wheel carrier, wherein an intersecting point of an imaginary line that connects the hinge point where the upper arm is mounted on the vehicle body and the pivot joint with an imaginary line orthogonal to the center line of the strut assembly becomes an imaginary instantaneous center of the upper arms with respect to the vehicle body. An intersecting point of an imaginary line that connects two hinge points of both ends of the lower arms with an imaginary line that connects the pivot joint and the hinge point where the upper arm connects to the wheel carrier becomes an instantaneous center of a wheel with respect to the strut arm so as to minimize rolling. An intersection between the imaginary line that links the intersecting point of the imaginary line that connects the hinge point of the upper arm to the vehicle body with the pivot joint connecting upper arms, with the imaginary line orthogonal to the center line of the strut assembly to the instantaneous center of the wheel with respect to the strut arm and the imaginary line connecting two hinge points of the upper arm becomes an instantaneous center of the wheel with respect to the vehicle body, as many links are connected.

BRIEF DESCRIPTION OF THE DRAWINGS

FIG. 3A depicts a Macpherson type suspension system; and

FIG. 3B depicts a Wishbone type suspension system.

DETAILED DESCRIPTION OF THE PREFERRED EMBODIMENT

Figure 1:
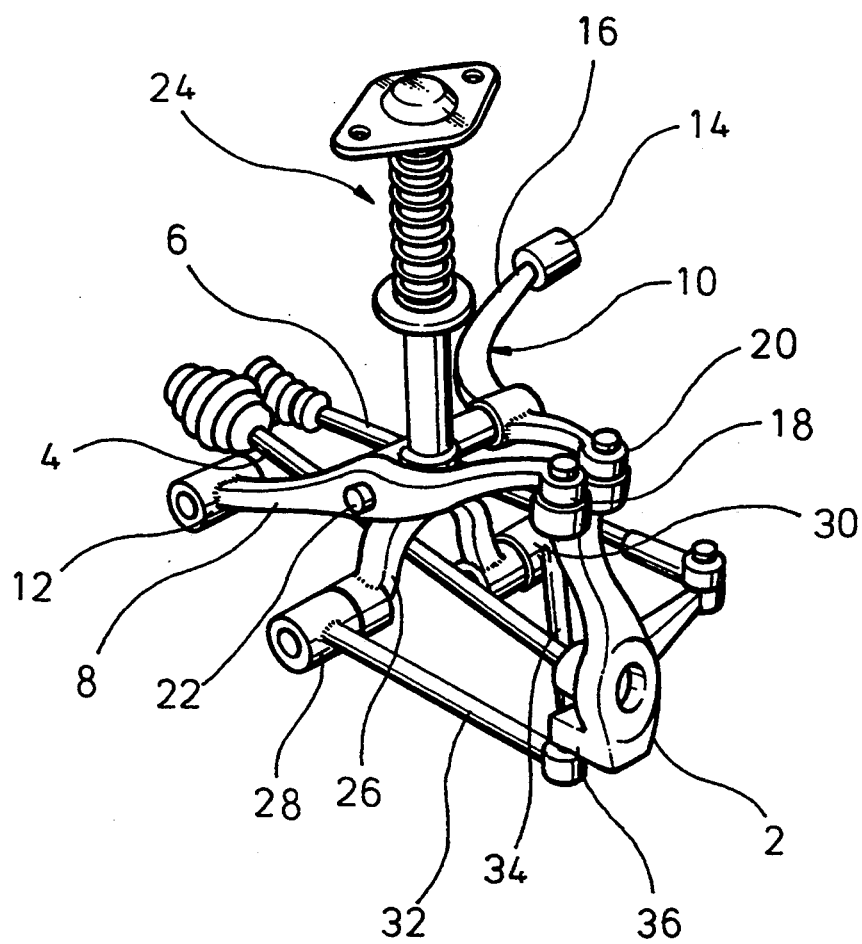
FIG. 1 is a perspective view of a preferred embodiment of the suspension in accordance with the present invention.

FIG. 1 is a perspective view of a suspension system for a steerable drive wheel comprising a driving shaft 4 that carries torque from an engine to a wheel carrier 2 through a transmission to rotate a drive wheel, and a tie rod 6 that operates steering in association with a piston of a steering gear box in accordance with a steering handle.

A pair of upper arms 8, 10 connected to the upper portion of the wheel carrier 2 includes connecting points 12, 14 by inserting a mounting bush therein to be connected to a vehicle body, and these points 12, 14 enable the upper arms 8, 10 to have an instantaneous center with respect to the vehicle body. To connect the pair of the upper arms 8, 10 to the wheel carrier 2 in the same horizontal plane, the upper portion of the wheel carrier 2 diverges, and the upper arms may be connected to the wheel carrier 2 by way of ball joints 18, 20. The upper arms 8, 10 diverge gradually towards the vehicle body from the point where they are connected with the wheel carrier 2, and connected to each other pivotally by way of a pivot joint 22.

The pivot joint 22 is integrated with the portion where the lower part of a strut assembly 24 consisting of a spring and a shock absorber is fixed to a strut arm 26. The lower part of the strut assembly 24 is connected to the strut arm 26 at the upward warped uppermost end of the strut arm 26.

Connecting points 28, 30 to which a mounting bush is inserted is fixed at both ends of the strut arm 26. One end of each of lower arms 32, 34 are connected smoothly to these connecting points 28, 30, and the other end of each of lower arms 32, 34 are connected to the lower end of the wheel carrier 2 by way of a ball joint 36. Therefore, the wheel carrier 2 has an instantaneous center, similar to the upper arms 8, 10.

Figure 2:
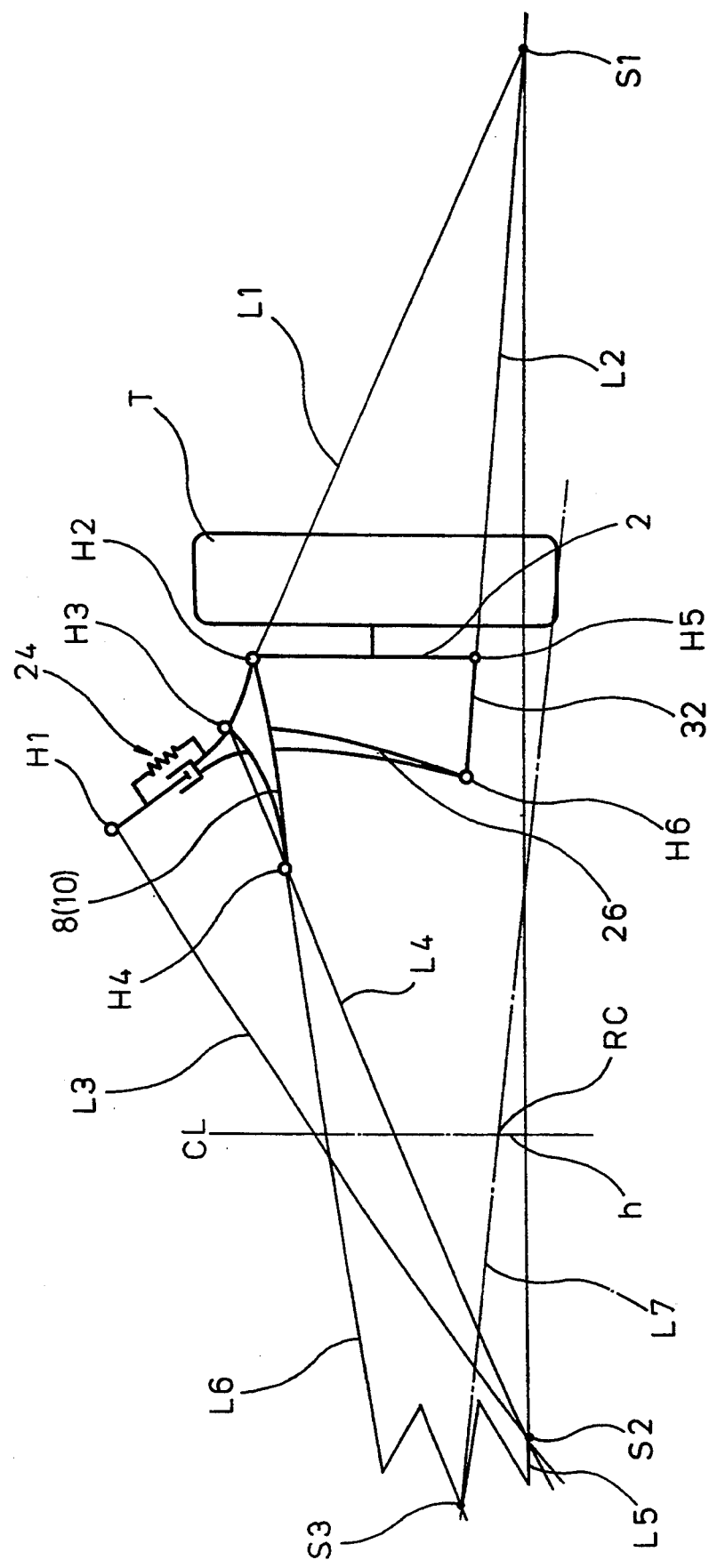
FIG. 2 is a skeleton diagram for describing the operation of the suspension in accordance with the embodiment of FIG. 1.

The suspension system of the present invention achieves instantaneous centers of the motion of every component, and this is illustrated in FIG. 2. The strut assembly 24 is connected to the vehicle body at a hinge point H1 and the upper arms 8, 10 and the wheel carrier 2 are connected to each other at a hinge point H2. A hinge point H3 for connecting a pair of upper arms 8, 10 to each other may have an organical relationship with a hinge point H4 connecting the upper arms 8, 10 to the vehicle body and these points provide the instantaneous center of the upper arms 8, 10 to the vehicle body.

Moreover, a lower end of the wheel carrier 2 is connected to the lower arm 32 at a hinge point H5, and the strut arm 26 and the lower arm 32 are connected to each other at a hinge point H6. These hinge points H1, H2, H3, H4, H5, H6 provide imaginary instantaneous centers to the car body when every component operates.

An imaginary line L1 connecting the hinge point H2 to the hinge point H3 and an imaginary line L2 connecting hinge points H5, H6 of both ends of the lower arm 32 to each other make one intersecting point instantaneously when the wheel carrier 2 moves upward and downward. This intersecting point is the very instantaneous center of the wheel carrier 2 with respect to the strut arm 26.

An imaginary line L3 orthogonal to the center axis of the strut assembly 24 and an imaginary line L4 connecting the hinge points H3, H4 of the upper arms 8, 10 intersect at a point, and this intersecting point is an instantaneous center S2 of the upper arms 8, 10 with respect to the vehicle body.

Therefore, as the wheel carrier 2 rotates centering an instantaneous center S1, the wheel T installed to the wheel carrier 2 gyrates. Since the instantaneous center is located far from the wheel T, the variation of rolling is minimized, with a radius of the gyration of the wheel T being formed imaginarily. And since the imaginary instantaneous center of the upper arms 8, 10 is defined as the point S2, it is located far from the upper arms 8, 10, and the gyration angle of the upper arms 8 becomes very tiny.

Moreover, an instantaneous center S3 that is an intersection between the imaginary line L5 connecting the instantaneous centers S1, S2 and an imaginary line L6 connecting the hinge points H2, H4 becomes an instantaneous center of the wheel T with respect to the vehicle body, and therefore the variation in the height of this instantaneous center S3 is minimized.

A roll center RC in FIG. 2 is located on a point where an imaginary line L7 connecting the instantaneous center S3 of the wheel T with respect to the vehicle body and wheel tread intersects a vertical center line CL of the vehicle body. Accordingly, the distance between the intersections of the center line CL of the vehicle body with the imaginary lines L5, L7 is defined as the height h of the roll center, and as shown above, the variation ratio of the height of the roll center is minimized because of the small variation ratio of the instantaneous center S3. This is related to driving safety, since the small variation of the roll center can improve driving safety.

Thus, in accordance with the present invention, the imaginary kingpin axis can be set up properly, and steering stability can be improved. And since the lower arm is mounted on the strut arm, the suspension system of the present invention can be attached to a steerable wheel and occupy a minimum space. Since the characteristics of the roll center, camber and wheel tread is defined by a pair of upper arms and the imaginary lower arms, the multi-link type suspension system of the present invention can ensure designing freedom in comparison with the prior Macpherson type or Wishbone type suspension.

What is claimed is:

1. A vehicle suspension system for a steerable drive wheel comprising:
   a wheel carrier having a tie rod for steering a wheel;
   a pair of upper arms each having one end connected to a vehicle body and the other end connected to said wheel carrier;
   connecting means for connecting said upper arms to said vehicle body and said wheel carrier;
   a strut arm connected to said connecting means, wherein a lower section of said strut arm forks to form two separate ends; and
   a pair of lower arms each having one end connected to one of said strut arm ends and the other end connected to said wheel carrier.

2. The system according to claim 1, wherein an intersecting point of an imaginary line parallel to a line that connects a hinge point where one of said upper arms is mounted on said vehicle body and a connection point of the upper arm and said connecting means, and an imaginary line orthogonal to a center line of said strut arm becomes an imaginary instantaneous center of said upper arm with respect to said vehicle body.

3. The system according to claim 2, wherein an intersecting point of an imaginary line parallel to said lower arms, and an imaginary line that connects the connection point with the hinge point becomes an instantaneous center of said wheel with respect to said strut arm.

4. The system according to claim 3, wherein a roll center lies at an intersecting point of an imaginary line that connects said instantaneous center of said wheel with a wheel tread, and a vertical center line of said vehicle body.

5. The system according to claim 1, wherein said upper arms rotate about said connecting means.

* * * * *